(12) United States Patent
Liu

(10) Patent No.: US 11,836,907 B2
(45) Date of Patent: Dec. 5, 2023

(54) PRODUCT DEFECT DETECTION METHOD, DEVICE AND SYSTEM

(71) Applicant: GOERTEK INC., Shandong (CN)

(72) Inventor: Jie Liu, Shandong (CN)

(73) Assignee: GOERTEK, INC., Shandong (CN)

( * ) Notice: Subject to any disclaimer, the term of this patent is extended or adjusted under 35 U.S.C. 154(b) by 294 days.

(21) Appl. No.: 17/309,309

(22) PCT Filed: Sep. 10, 2020

(86) PCT No.: PCT/CN2020/114399
§ 371 (c)(1),
(2) Date: May 18, 2021

(87) PCT Pub. No.: WO2021/135372
PCT Pub. Date: Jul. 8, 2021

(65) Prior Publication Data
US 2022/0309639 A1    Sep. 29, 2022

(30) Foreign Application Priority Data

Dec. 30, 2019 (CN) .......................... 201911402024.9

(51) Int. Cl.
*G06T 7/00*  (2017.01)
*G06T 7/11*  (2017.01)
(Continued)

(52) U.S. Cl.
CPC .............. *G06T 7/0004* (2013.01); *G06T 7/11* (2017.01); *G06T 7/13* (2017.01); *G06T 7/155* (2017.01);
(Continued)

(58) Field of Classification Search
CPC ..................... G06T 7/571; G06T 7/001; G06T 2207/30148; G06T 7/0004; G01N 21/95685; G01N 20/00
See application file for complete search history.

(56) References Cited

U.S. PATENT DOCUMENTS 6,546,308 B2 *  4/2003  Takagi ................... G01N 21/94
                                              700/121
7,127,098 B2 * 10/2006  Shimoda ................. G06T 7/571
                                              250/208.3
(Continued)

FOREIGN PATENT DOCUMENTS

CN       101292263 A     10/2008
CN       103308523 A      9/2013
(Continued)

OTHER PUBLICATIONS

Chinese Matter's Theses, Research on Detection and Grasping System of Glass Bottle Defects Based on Machine Vision, Apr. 2016.

*Primary Examiner* — Yosef Kassa
(74) *Attorney, Agent, or Firm* — LKGlobal | Lorenz & Kopf, LLP

(57) ABSTRACT

A product defect detection method, device and system are disclosed. The product defect detection method comprises: constructing a defect detection framework including a classification network, a localization and detection network, and a judgment network, and setting a quantity of the localization and detection network and judgment rules of the judgment network according to classification results of the classification network, wherein each localization and detection network is associated with a classification result, and each judgment rule is associated with a detection result of the localization and detection network; when performing product defect detection, inputting a product image acquired (Continued)

into the defect detection framework, using the classification network to classify defect types in the product image, detecting defects of the product image according to a localization and detection network associated with a classification result, then judging whether the product has a defect, and detecting a defect type and a defect position.

17 Claims, 5 Drawing Sheets

(51) Int. Cl.
| | |
|---|---|
| *G06T 7/73* | (2017.01) |
| *G06T 7/13* | (2017.01) |
| *G06T 7/155* | (2017.01) |
| *G06T 7/529* | (2017.01) |
| *G06V 10/54* | (2022.01) |
| *G06V 10/94* | (2022.01) |
| *G06V 10/774* | (2022.01) |
| *G06V 10/776* | (2022.01) |
| *G06V 10/764* | (2022.01) |
| *G06V 10/22* | (2022.01) |
| *G06V 10/34* | (2022.01) |
| *G06T 7/60* | (2017.01) |

(52) U.S. Cl.
CPC ............... *G06T 7/529* (2017.01); *G06T 7/60* (2013.01); *G06T 7/73* (2017.01); *G06V 10/225* (2022.01); *G06V 10/34* (2022.01); *G06V 10/54* (2022.01); *G06V 10/764* (2022.01); *G06V 10/774* (2022.01); *G06V 10/776* (2022.01); *G06V 10/95* (2022.01); *G06T 2207/20021* (2013.01); *G06T 2207/20036* (2013.01); *G06T 2207/20081* (2013.01); *G06T 2207/30108* (2013.01)

(56) References Cited

U.S. PATENT DOCUMENTS

| | | | | |
|---|---|---|---|---|
| 7,187,780 | B2 * | 3/2007 | Tian | H04N 1/32331 |
| | | | | 382/100 |
| 7,394,530 | B2 * | 7/2008 | Budd | G01N 21/8851 |
| | | | | 356/237.1 |
| 7,409,081 | B2 * | 8/2008 | Ogi | G06T 7/0004 |
| | | | | 715/838 |
| 7,598,490 | B2 * | 10/2009 | Kurihara | G01N 21/9501 |
| | | | | 250/311 |
| 8,223,837 | B2 * | 7/2012 | Sun | H04N 19/587 |
| | | | | 375/240.09 |
| 8,452,053 | B2 * | 5/2013 | Zhang | G06V 20/588 |
| | | | | 382/104 |
| 8,452,076 | B2 * | 5/2013 | Nakagaki | G06V 10/774 |
| | | | | 382/149 |
| 8,805,073 | B2 * | 8/2014 | Von Berg | G06T 7/12 |
| | | | | 345/421 |
| 8,977,580 | B2 * | 3/2015 | Anayama | G06T 7/0004 |
| | | | | 706/12 |
| 2008/0059094 | A1 | 3/2008 | Shimura et al. | |
| 2019/0293669 | A1 | 9/2019 | Savchenko et al. | |

FOREIGN PATENT DOCUMENTS

| | | |
|---|---|---|
| CN | 109632809 A | 4/2019 |
| CN | 109727229 A | 5/2019 |
| CN | 109741295 A | 5/2019 |
| CN | 110136110 A | 8/2019 |
| CN | 110175982 A | 8/2019 |
| CN | 110276754 A | 9/2019 |
| CN | 110487802 A | 11/2019 |
| CN | 111044525 A | 4/2020 |
| CN | 111060520 A | 4/2020 |

* cited by examiner

PRODUCT DEFECT DETECTION METHOD, DEVICE AND SYSTEM

CROSS-REFERENCE TO RELATED APPLICATION

This Application is a U.S. National-Stage entry under 35 U.S.C. § 371 based on International Application No. PCT/CN2020/114399, filed Sep. 10, 2020 which was published under PCT Article 21(2) and which claims priority to Chinese Application No. 201911402024.9, filed Dec. 30, 2019, which are all hereby incorporated herein in their entirety by reference.

TECHNICAL FIELD

This Application pertains to a product defect detection method, device and system.

BACKGROUND

In the traditional precision manufacturing industry, product defect detection is generally completed by manual inspection. In a typical manufacturing plant, nearly 30% of the employees are inspection personnel. Due to the large labor demand, there is often a shortage of human resources; moreover, the work intensity of inspection is high, and the inspection quality is easy to fluctuate due to fatigue of operators. Therefore, automated inspection solutions of machines that have stable inspection quality, consistent results, and are not affected by human factors will surely be welcomed by the precision manufacturing industry. In addition, other objects, desirable features and characteristics will become apparent from the subsequent summary and detailed description, and the appended claims, taken in conjunction with the accompanying drawings and this background.

SUMMARY

The objective of the present disclosure is to provide a product defect detection method, device and system.

In an aspect, the embodiment of the present disclosure provides a product defect detection method. The method comprises:

constructing a defect detection framework including a classification network, a localization and detection network, and a judgment network;

setting a quantity of the localization and detection network and judgment rules of the judgment network according to classification results of the classification network, wherein each localization and detection network is associated with a classification result, and each judgment rule is associated with a detection result of the localization and detection network;

training the classification network by using a sample image of a product containing different defect types to obtain a classification network capable of classifying defect types existing in the sample image; and when performing product defect detection, inputting a product image acquired into the defect detection framework, using the classification network to classify defect types in the product image, detecting defects of the product image according to a localization and detection network associated with a classification result, then judging whether the product has a defect according to a judgment rule associated with a detection result obtained, and detecting a defect type and a defect position when the product has a defect.

In another aspect, the embodiment of the present disclosure provides a product defect detection device. The device comprises:

a preprocessing unit for constructing a defect detection framework including a classification network, a localization and detection network, and a judgment network; setting a quantity of the localization and detection network and judgment rules of the judgment network according to classification results of the classification network, wherein each localization and detection network is associated with a classification result, and each judgment rule is associated with a detection result of the localization and detection network; and training the classification network by using a sample image of a product containing different defect types to obtain a classification network capable of classifying defect types existing in the sample image; and a defect detection unit for, when performing product defect detection, inputting an product image acquired into the defect detection framework, using the classification network to classify the defect types in the product image, detecting defects of the product image according to a localization and detection network associated with a classification result, then judging whether the product has a defect according to a judgment rule associated with a detection result obtained, and detecting a defect type and a defect position when the product has a defect.

In yet another aspect, the embodiment of the present disclosure provides a product defect detection system. The system comprises: a memory and a processor;

the memory stores computer executable instructions;

when the computer executable instructions are executed, the processor executes the product defect detection method.

In still yet another aspect, the embodiment of the present disclosure provides a computer readable storage medium. One or more computer programs are stored on the computer readable storage medium, and the product defect detection method is implemented when the one or more computer programs are executed.

The present disclosure can achieve at least the following technical effects. A defect detection framework is constructed using a classification network, a localization and detection network and a judgment network. In the process of constructing the defect detection framework, a classification network and a localization and detection network are provided based on the product defect type, so that in the product defect detection process, the defects that may exist in the product image can be classified using the classification algorithm first, and then on the basis of the defect classification, the localization and detection algorithm is used to quickly locate the defect position, and thus it can be accurately detected whether the product has a defect through two-stage detection, and when the product has a defect, the defect type and defect position are detected.

BRIEF DESCRIPTION OF DRAWINGS

The present invention will hereinafter be described in conjunction with the following drawing figures, wherein like numerals denote like elements, and.

DETAILED DESCRIPTION

Figure 1:
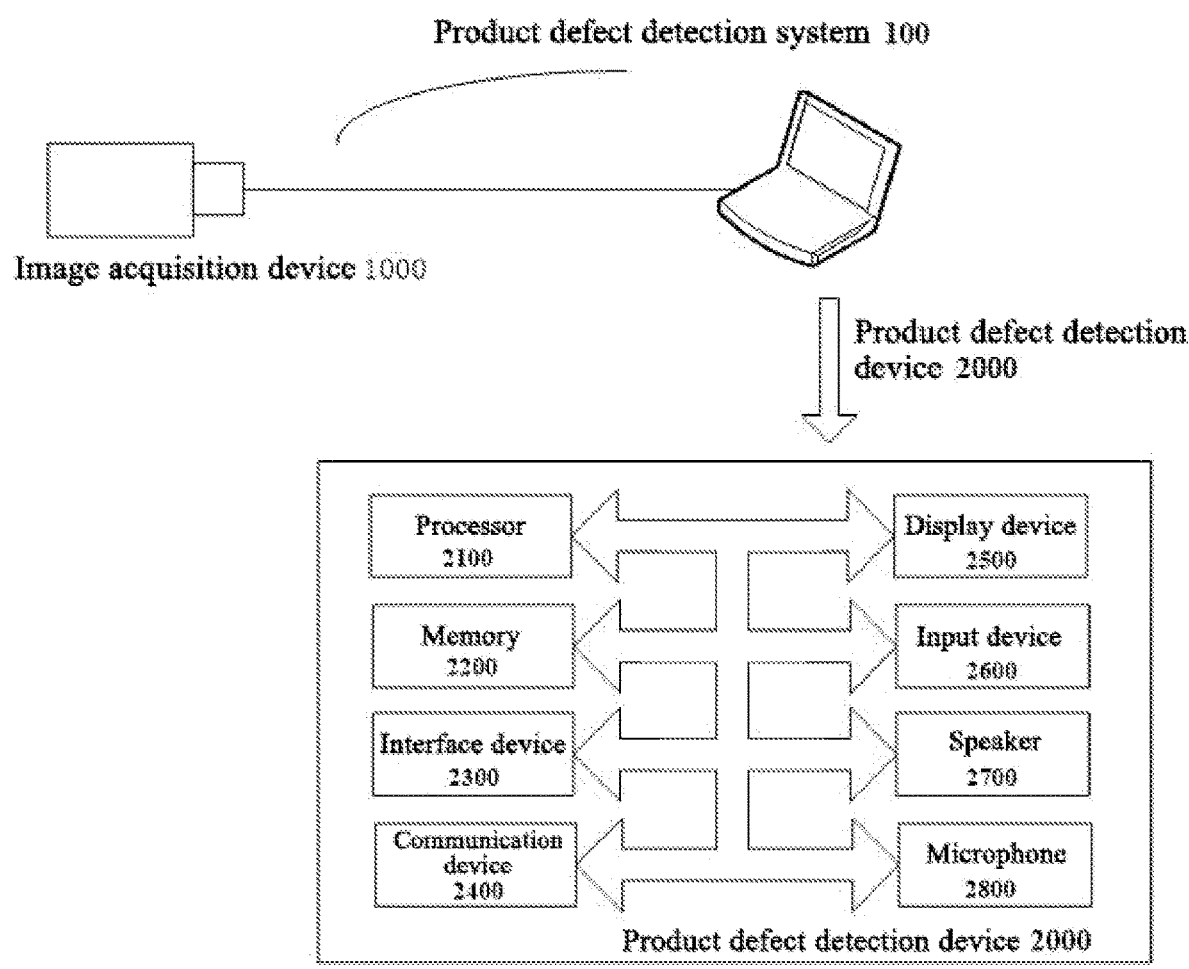
FIG. 1 is a block diagram of the hardware configuration of a product defect detection system according to an embodiment of the present disclosure.

The following detailed description is merely exemplary in nature and is not intended to limit the invention or the application and uses of the invention. Furthermore, there is no intention to be bound by any theory presented in the preceding background of the invention or the following detailed description.

Now, various embodiments of the present disclosure will be described in detail with reference to the drawings. It should be noted that, unless specified otherwise, the arrangements of the members and steps, mathematical formulas and numerical values described in these embodiments do not limit the scope of the present disclosure.

The following description of at least one embodiment is actually for illustrative purposes only, and is not intended to limit the present disclosure and application or use thereof in any way.

The techniques, methods and devices well known to a person of ordinary skill in the related arts may not be discussed in detail. However, when applicable, such techniques, methods and devices should be deemed as a part of the description.

In all the examples shown and discussed herein, any specific value should be interpreted as illustrative only rather than restrictive. Therefore, other examples in the embodiments may have different values.

It should be noted that similar reference numerals and letters in the following drawings represent similar items. Therefore, once an item is defined in a drawing, it may not be further discussed in the subsequent drawings.

First Embodiment

FIG. 1 is a block diagram of the hardware configuration of a product defect detection system 100 according to an embodiment of the present disclosure.

As shown in FIG. 1, the product defect detection system 100 comprises an image acquisition device 1000 and a product defect detection device 2000.

The image acquisition device 1000 is configured to acquire a product image and provide the acquired product image to the product defect detection device 2000.

The image acquisition device 1000 may be any imaging device capable of taking pictures, such as a camera, etc.

The product defect detection device 2000 may be any electronic device, such as a PC, a notebook computer, a server, etc.

In the present embodiment, referring to FIG. 1, the product defect detection device 2000 may comprise a processor 2100, a memory 2200, an interface device 2300, a communication device 2400, a display device 2500, an input device 2600, a speaker 2700, a microphone 2800, etc.

The processor 2100 may be a mobile version processor. The memory 2200 includes, for example, ROM (Read Only Memory), RAM (Random Access Memory), nonvolatile memory such as a hard disk, etc. The interface device 2300 includes, for example, a USB interface, a headphone interface, etc. The communication device 2400 can, for example, perform wired or wireless communication. The communication device 2400 may include short-range communication devices, for example, any device that performs short-range wireless communication based on a short-range wireless communication protocol such as Hilink protocol, WiFi (IEEE 802.11 protocol), Mesh, Bluetooth, ZigBee, Thread, Z-Wave, NFC, UWB, LiFi, etc. The communication device 2400 may also include a remote communication device, for example, any device that performs WLAN, GPRS, 2G/3G/4G/5G remote communication. The display device 2500 is, for example, a liquid crystal display, a touch screen, etc. The display device 2500 is configured to display the target image acquired by the image acquisition device 1000. The input device 2600 may include, for example, a touch screen, a keyboard, etc. The user can input/output voice information through the speaker 2700 and the microphone 2800.

In the present embodiment, the memory 2200 of the product defect detection device 2000 is configured to store instructions for controlling the processor 2100 to operate to at least execute the product defect detection method according to any embodiment of the present disclosure. A person skilled in the art can design instructions according to the solutions disclosed in the present disclosure. It is well known in the art how the instructions control the processor to operate, and thus will not be described in detail here.

Although multiple devices of the product defect detection device 2000 are shown in FIG. 1, the present disclosure may only involve some of them. For example, the product defect detection device 2000 only involves the memory 2200, the processor 2100 and the display device 2500.

In the present embodiment, the image acquisition device 1000 is configured to acquire a product image and provide it to the product defect detection device 2000, and the product defect detection device 2000 implements the product defect detection method according to any embodiment of the present disclosure based on the image.

It will be appreciated that, although FIG. 1 only shows one image acquisition device 1000 and one product defect detection device 2000, it does not mean to limit their respective quantities. The product defect detection system 100 may comprise a plurality of image acquisition devices 1000 and/or product defect detection devices 2000.

Second Embodiment

In the product manufacturing process, the products obtained often have various forms of defects due to factors such as instability of upstream process, insufficient mechanical positioning accuracy and the environment in the plant, etc. Take wire mesh products as an example, the defect categories of wire mesh products mainly include three types of defect: breakage, impurities and double mesh.

Among them, the breakage defect is caused by the broken mesh wire or the deformation of the mesh hole. Some breakage defects appear to be a much larger mesh hole than normal mesh holes, and some other breakage defects appear to be similar to normal mesh holes in area but much different from normal mesh holes in morphology. The impurity defect is caused by excess mesh raw materials left on the wire mesh or floating objects in the workshop falling down on the wire mesh in a scattered manner. In the image the impurity defect generally appears black and is similar to the mesh wire. Since the impurities and the mesh wires in the image have the same color and some impurities are very small, the detection of impurity defects is also difficult. The double mesh defect is typically generated when two or more wire mesh wires are placed on a workpiece at the same time, and it is quite different from a normal product.

In addition, the defect categories of wire mesh products also includes a fine mesh deviation defect which is caused by a small number of mesh wires not overlapping due to the slight rotation of the mesh cloth when the mesh cloth is attached. Since this type of defect is very small in area, it is a difficult point in the defect detection of wire mesh products.

With respect to the problems of product defects as described above, the general concept of the embodiments of the present disclosure is as follows: take the image classification algorithm based on deep learning as the core, and then on the basis of image classification, establish a corresponding detection algorithm based on texture features and shape features exhibited by various defects to quickly locate the position of each type of defect, so as to accurately detect whether the product has a defect, and further detect the type and position of the defect.

In the present embodiment, the wire mesh product is taken as an example to illustrate specific technical details, but the technical solutions of the present embodiment are not limited to scenarios of detecting defects in wire mesh products.

Figure 2:
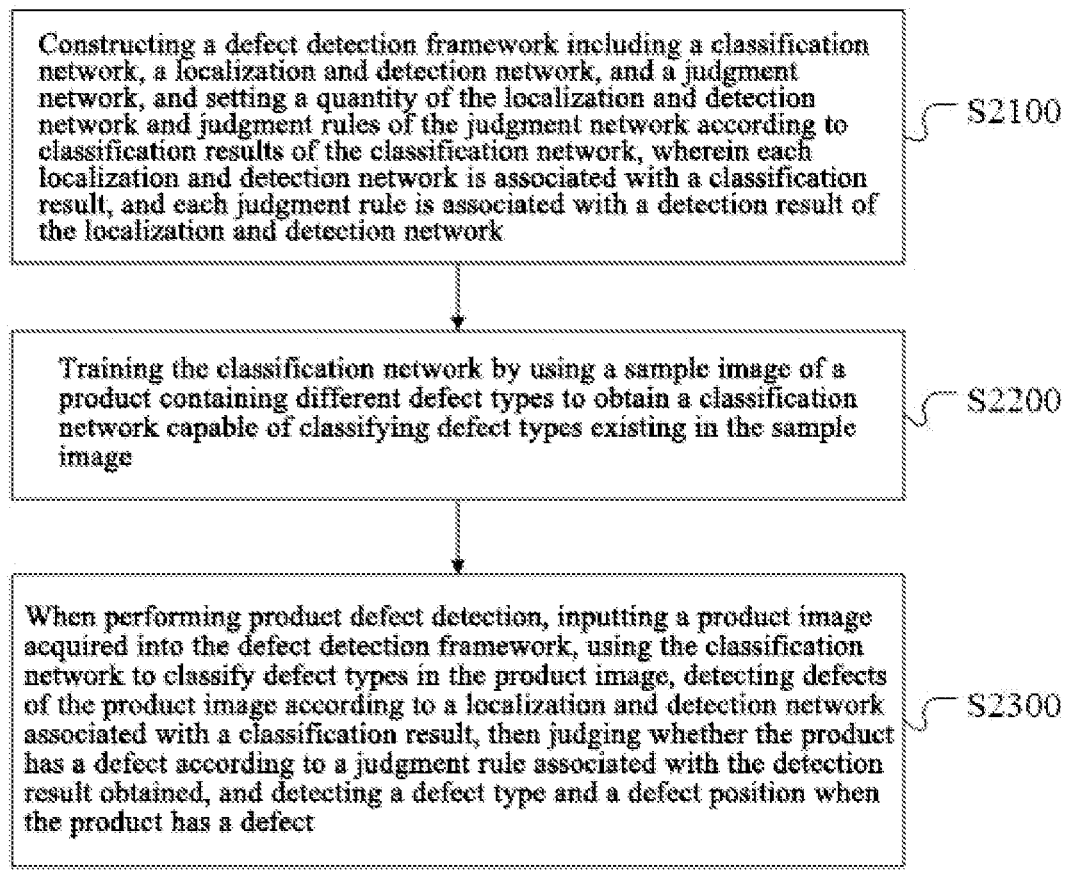
FIG. 2 is a flowchart of a product defect detection method according to an embodiment of the present disclosure.

FIG. 2 is a flowchart of a product defect detection method according to an embodiment of the present disclosure. As shown in FIG. 2, the method in the present embodiment comprises:

S2100: constructing a defect detection framework including a classification network, a localization and detection network, and a judgment network, and setting a quantity of the localization and detection network and judgment rules of the judgment network according to classification results of the classification network, wherein each localization and detection network is associated with a classification result, and each judgment rule is associated with a detection result of the localization and detection network.

The classification network, the localization and detection network and the judgment network are serially connected in sequence.

The classification network is used to classify the defect types of products.

The localization and detection network is used to further detect and locate the defect types of the product on the basis of the classification result. Each localization and detection network performs defect detection on the product image based on the texture feature and/or morphological feature of the corresponding defect.

The judgment network is used to comprehensively judge whether the product has a defect according to the classification results output by the classification network and the detection results output by the localization and detection network, and when there is a defect, detect the defect type and mark the defect position.

S2200: training the classification network by using a sample image of a product containing different defect types to obtain a classification network capable of classifying the defect types existing in the sample image.

In the present embodiment, the classification network is implemented using an image segmentation algorithm based on deep learning. For example, network models such as Alxnet, Vgg, Resnet, Inception net, Densenet, Googlenet, Nasnet and Xception can be used to build a classification network. Since the Densenet (Dense Convolutional Network) network model has the characteristics of fast classification speed and high classification accuracy, the present embodiment preferably uses the Densenet network model to build the classifier.

S2300: when performing product defect detection, inputting a product image acquired into the defect detection framework, using the classification network to classify defect types in the product image, detecting defects of the product image according to a localization and detection network associated with a classification result, then judging whether the product has a defect according to a judgment rule associated with the detection result obtained, and detecting a defect type and a defect position when the product has a defect.

In some embodiments, after the product image is acquired, image preprocessing may be performed on the product image, for example, size adjustment, noise reduction processing, etc. are performed on the product image, and the product image preprocessed is input into the defect detection framework.

In the present embodiment, a defect detection framework is constructed using a classification network, a localization and detection network and a judgment network. In the process of constructing the defect detection framework, a classification network and a localization and detection network are provided based on the product defect type, so that in the product defect detection process, the defects that may exist in the product image can be classified using the classification algorithm first, and then on the basis of the defect classification, the localization and detection algorithm is used to quickly locate the defect position, and thus it can be accurately detected whether the product has a defect through two-stage detection, and when the product has a defect, the defect type and defect position are detected.

The detection method of the present embodiment can satisfy the requirements of the production line and improve the efficiency of the production line.

Third Embodiment

The present embodiment further provides a product defect detection method. In the present embodiment, in the process of constructing a defect detection network framework, the classification result in the above step S2100 includes:

a first type of classification result that it has been detected that there is a first type of defect in the product image, wherein the first type of defect is a defect for which a classification accuracy rate of defect type by the classification network is greater than a first threshold value;

a second type of classification result that it has been detected that there is a second type of defect in the product image, wherein the second type of defect is a defect for which a classification accuracy rate of defect type by the classification network is not greater than the first threshold value; and a third type of classification result that it has been detected that there is not a defect in the product image.

In some embodiments, the classification result further includes a fourth type of classification result that it has been detected that there is a fourth type of defect in the product image. The fourth type of defect is a defect type that the classification network can correctly classify, that is, the classification accuracy rate of fourth type of defect by the classification network is very high, and no further verification is necessary, so the fourth type of classification result may not be associated with a localization and detection network.

In the present embodiment, a localization and detection network corresponding to the fourth type of defect is not set, and it is not necessary to use the localization and detection network to perform localization and detection on the product image having only the fourth type of defect. When the classification network outputs the above classification result, setting a quantity of the localization and detection network and judgment rules of the judgment network according to classification results of the classification network in step S2100 comprises:

setting a first localization and detection network to be associated with the first type of classification result, a second localization and detection network to be associated with the second type of classification result, a third localization and detection network to be associated with the third type of classification result, and the fourth type of classification result not to be associated with a localization and detection network; correspondingly, setting a first judgment rule to be associated with the detection result of the first localization and detection network, a second judgment rule to be associated with the detection result of the second localization and detection network, and a third judgment rule to be associated with the detection result of the third localization and detection network.

In the present embodiment, the defect types of the product include the first type of defect, the second type of defect, the third type of defect, and the fourth type of defect, and the first threshold value can be set according to the accuracy rate of defect type of the classification network. When the product is a wire mesh product, the defect types of the product include: double mesh defects, breakage defects, impurity defects, and fine mesh deviation defects. Among them, the breakage defect is the first type of defect, the impurity defect is the second type of defect, the fine mesh deviation defect is the third type of defect, and the double mesh defect is the fourth type of defect. Correspondingly, the first threshold value can be set to 0.90.

Take the wire mesh product as an example, the accuracy rates of classification network for these four types of defects (namely, breakage, impurity, double mesh, and fine mesh deviation) from high to low are: the accuracy rate of classification for the double mesh defect>the accuracy rate of classification for the breakage defect>the accuracy rate of classification for the impurity defect>the accuracy rate of classification for the fine mesh deviation. In other words, when the classification network is used to classify and detect a product image including these four types of defects, among the classification results, the classification value corresponding to the double mesh defect is above 0.9999 (which can be deemed as 1), the classification value corresponding to the breakage defect is above 0.90, the classification value corresponding to the impurity defect is less than 0.70, and the classification value corresponding to the fine mesh deviation is close to 0. The classification value indicates the accuracy rate of defect classification by the classification network. The larger the classification value is, the higher the accuracy rate of defect classification by the classification network is, and the more reliable the classification result is. The smaller the classification value is, the lower the accuracy rate of defect classification by the classification network is, and the less reliable the classification results is.

Therefore, in the present embodiment, there is no need to use the localization and detection network to further locate and detect the double mesh defects classified by the classification network, and it must use the localization and detection network to further locate and detect the breakage defects and impurity defects classified by the classification network. Moreover, it is difficult for the classification network to classify fine mesh deviation defects, so it is also necessary to specially set up a localization and detection network for detecting fine mesh deviation defects. With respect to the four types of defects of the wire mesh product, the number of localization and detection networks can be set to three, and correspondingly, the judgment network can be set to include three judgment rules.

Figure 3:
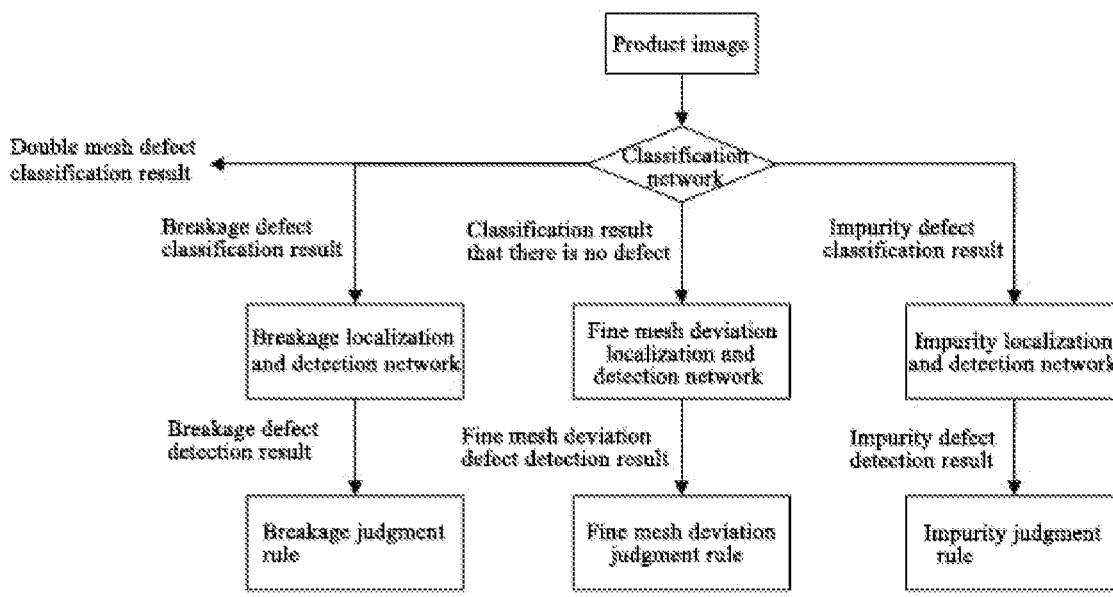
FIG. 3 is a schematic diagram of a defect detection framework according to an embodiment of the present disclosure.

FIG. 3 shows a defect detection framework corresponding to a wire mesh product. As shown in FIG. 3, for a wire mesh product, the classification network classifies the defects in the product image and can output four classification results: a classification result that there is a double mesh defect in the image; a classification result that there is a breakage defect in the product image; a classification result that there is a impurity defect in the product image; and a classification result that there is no defect in the product image. It should be noted that, in the present embodiment, the classification ability of the classification network for the fine mesh deviation defect is close to 0, namely, the classification network cannot classify fine mesh deviation defects. Therefore, for the wire mesh products, the classification network can output the above four classification results. The localization and detection networks corresponding to respective detection results include a breakage localization and detection network, an impurity localization and detection network, and a fine mesh deviation localization and detection network. The corresponding judgment rules in the judgment network include a breakage judgment rule, an impurity judgment rule and a fine mesh deviation judgment rule.

Fourth Embodiment

The present embodiment further provides a product defect detection method. In the present embodiment, when the classification network outputs the first type of classification result, the above step S2300 further comprises S2410 to S2420:

S2410: extracting multiple image blocks where a product texture is located from the product image using a first localization and detection network associated with the first type of classification result; and calculating whether there is a target image block having an area larger than a preset area among the multiple image blocks using the first localization and detection network, and if Yes, generating a first type of detection result; if Not, generating a second type of detection result;

wherein the first type of detection result is that a locating box for locating a position of the first type of defect has been detected, the second type of detection result is that a locating box for locating a position of the first type of defect has not been detected, and the locating box is a minimum circumscribed rectangle of the target image block.

The first location and detection network locates and detects the first type of defect in the product image based on texture features.

In some embodiments, the first localization and detection network may first perform binarization processing on the product image, then perform region detection on the binary image obtained, and extract multiple image blocks where the product texture is located from the binary image based on the region detection result. Take the wire mesh product as an example, the mesh hole region detection is performed on the binarized wire mesh product image, and the image block of the wire mesh product image where each mesh hole region is located can be extracted, and thus multiple image blocks can be obtained.

After extracting multiple image blocks, the first localization and detection network calculates the pixel area of each image block, compares the pixel area of each image block with a preset area, when there is an image block having a pixel area larger than the preset area, it indicates that this image block has the first type of defect, the first type of detection result is generated, and the minimum circumscribed rectangle of this image block is used as the locating box for locating the position of the first type of defect. When none of the image blocks has a pixel area greater than the preset area, it indicates that the first localization and detection network has not detected the position of the first type of defect, and the second type of detection result is generated at this time.

The preset area can be set according to survey. For example, a certain number of negative sample images without product defects are surveyed to calculate an average area based on multiple image blocks extracted from the negative sample images, a certain number of positive sample images having the first type of defects are surveyed to calculate an average area based on multiple image blocks extracted from the positive sample images, and the preset area of the present embodiment is set based on these two average areas, so as to distinguish the image block where the first type of defect is located by using the preset area.

S2420: using a first judgment rule associated with a detection result output by the first localization and detection network to judge whether the product has the first type of defect.

The specific judgment process of the first judgment rule is: if the detection result output by the first localization and detection network is the first type of detection result, determining that the product has the first type of defect, and marking the first type of defect using the locating box; and if the detection result output by the first localization and detection network is the second type of detection result, determining that the product has the first type of defect, but not marking the first type of defect.

It should be noted that, since in the present embodiment, the classification accuracy rate of the classification network for the first type of defect is greater than the first threshold value, that is, the classification network has a high classification accuracy rate for the first type of defect, it is considered in the present embodiment that if the classification result of the classification network indicates that the product has the first type of defect, then when the first localization and detection network is used to further detect the product image, no matter whether the first localization and detection network detects the position of the first type of defect, the judgment network will judge that the product image has the first type of defect. The difference lies in whether the first type of defect in the product image can be marked. Namely, if the first localization and detection network has detected the locating box used to locate the position of the first type of defect, the locating box can be used to mark the first type of defect, so that the position of the first type of defect can be displayed according to the mark during the application process. If the first localization and detection network has not detected the locating box for locating the position of the first type of defect, the first type of defect cannot be marked at this time, that is, the position of the first type of defect cannot be located.

As shown in FIG. 3, when the classification network is used to classify and detect the product image of the wire mesh product, if the classification result output by the classification network indicates that the product image has a breakage defect, the breakage localization and detection network is used to locate and detect the breakage defect in the product image, and the breakage judgment rule is used to determine whether the product image has the breakage defect.

Figure 4:
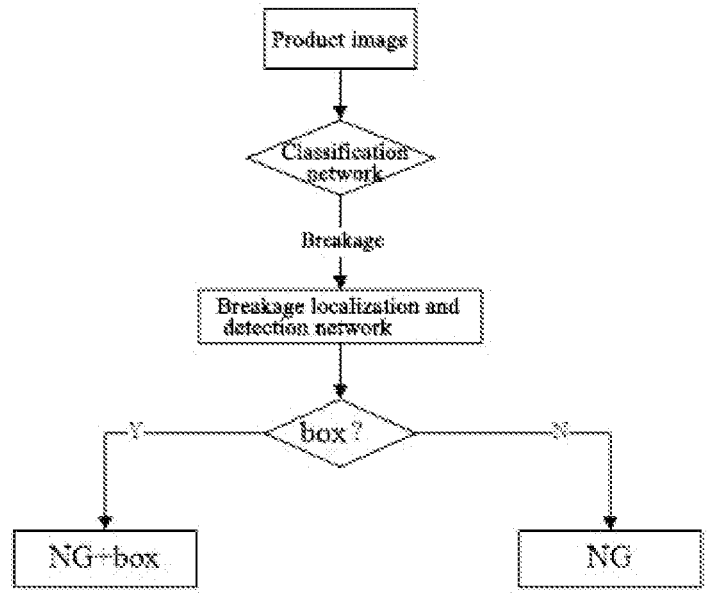
FIG. 4 is a flowchart of detecting breakage defects according to an embodiment of the present disclosure.

As shown in FIG. 4, the judgment process of the breakage judgment rule is: when the detection result output by the breakage localization and detection network includes the box for locating the position of the breakage defect in the product image, it is judged that the product has a breakage defect and is not a good (NG) product, and the box is used to mark the breakage defect. When the detection result output by the breakage localization and detection network does not include the box for locating the position of the breakage defect in the product image, it is judged that the product has a breakage defect and is an NG product.

Fifth Embodiment

The present embodiment further provides a product defect detection method. In the present embodiment, when the classification network outputs the second type of classification result, the above step S2300 further comprises S2430 to S2440:

S2430: performing morphological detection on the product image using a second localization and detection network associated with the second type of classification result; when a locating box for locating the second type of defect is not detected, generating a second type of detection result; when a locating box for locating the second type of defect is detected, judging whether a first shape feature of an image block of the product image where the locating box is located satisfies a preset condition, if Yes, generating a first type of detection result, if Not, generating the second type of detection result;

wherein the first type of detection result is that a locating box for locating a position of the second type of defect has been detected, the second type of detection result is that a locating box for locating a position of the second type of defect has not been detected, and the locating box is a minimum circumscribed rectangle of an image block whose first shape feature satisfies the preset condition.

In some embodiments, the second localization and detection network detects the second type of defect in the product image by the following method:

performing a morphological closing operation on the product image, performing binarization processing on the image after processed by the morphological closing operation, and performing region detection on a binary image obtained; when it has been detected that the binary image has a connected region, determining that the locating box for locating a position of the second type of defect has been detected, wherein an image block of the product image corresponding to the connected region is extracted, and a minimum circumscribed rectangle of the image block is used as the locating box; when it has been detected that the binary image has not a connected region, determining that the locating box for locating a position of the second type of defect has not been detected.

When there is the second type of defect in the product image, the morphological closing operation is performed on the product image to corrode the normal image texture inside the image. The texture of the second type of defect in the product image will not be completely corroded, and a part of the texture will be left. At this time, the binarization processing is performed on the image, and the region detection is performed on the binary image. Then, the connected region formed by the residual texture feature of the second type of defect can be extracted from the binary image, and thus the second localization and detection network generates the first type of detection result, that is, the second localization and detection network uses the minimum circumscribed rectangle of the image block of the product image corresponding to the connected region as the locating box for locating the position of the second type of defect.

Take the wire mesh product as an example, the impurity defect is the second type of defect in the present embodiment. When the wire mesh product image has the impurity defect, the morphological closing operation is performed on the wire mesh product image to corrode the mesh texture of normal mesh holes inside the image, and a part of texture of the impurity defect will be left. Among them, the impurities at the boundary position of the image and the impurities at the center of the image (that is, the non-boundary position of the image) in the image of the wire mesh product are different in morphology.

The impurity region at the non-boundary position of the image will not be completely corroded since it crosses the mesh wire or is thicker than the normal mesh wire, and the corresponding first type of impurity region can be obtained by extracting the connected region therein.

The impurity region at the boundary position of the image generally appears as a large black block. After performing the morphological closing operation, this region appears as a prominent black block. The connected region can be quickly located by horizontal projection and vertical projection, namely, the corresponding second type of impurity region can be obtained.

After the connected region formed by the impurity texture is extracted, the connected region can be used to extract the image block where the connected region is located from the wire mesh product image, and the minimum circumscribed rectangle of this image block is used as the locating box for locating the impurity defect.

In some embodiments, one or more of a black-and-white ratio, an area, an average area, an area range, and a distance between a center of figure and a center of mass of the image block corresponding to the locating box are extracted as the first shape feature of the image block. The black-and-white ratio is a ratio of a quantity of black pixels to a quantity of white pixels in a binarized image block corresponding to the image block. The area is the pixel area of the image block, and the pixel area can be understood as the number of pixels included in the image block. The average area is an average value of pixel areas of all connected regions extracted from the image block. Take the wire mesh product as an example, the image block of the wire mesh product image has impurity defects and normal mesh wires that cross the impurity defects. There are blank regions between normal mesh wires or between impurity defects and normal mesh wires. These blank regions are connected regions, and the average value of all connected regions in the image block is taken as the average area. The area range is a difference between a pixel area of a largest connected region and a pixel area of a smallest connected region extracted from the image block.

After determining the first shape feature of the image block, if each first shape feature of the image block satisfies its corresponding preset condition, the first type of detection result is generated; if the image block has one or more first shape features that do not satisfy its corresponding preset condition, the second type of detection result is generated. Among them, when the black-and-white ratio is greater than a black-and-white ratio threshold value, it is determined to satisfy a black-and-white ratio preset condition; when the area is greater than an area threshold value, it is determined to satisfy an area preset condition; when the average area is greater than an average area threshold value, it is determined to satisfy an average area preset condition; when the area range is greater than an area range threshold value, it is determined to satisfy a range preset condition; and when the distance between a center of figure and a center of mass is greater than a distance threshold value, it is determined to satisfy a distance preset condition.

Figure 5:
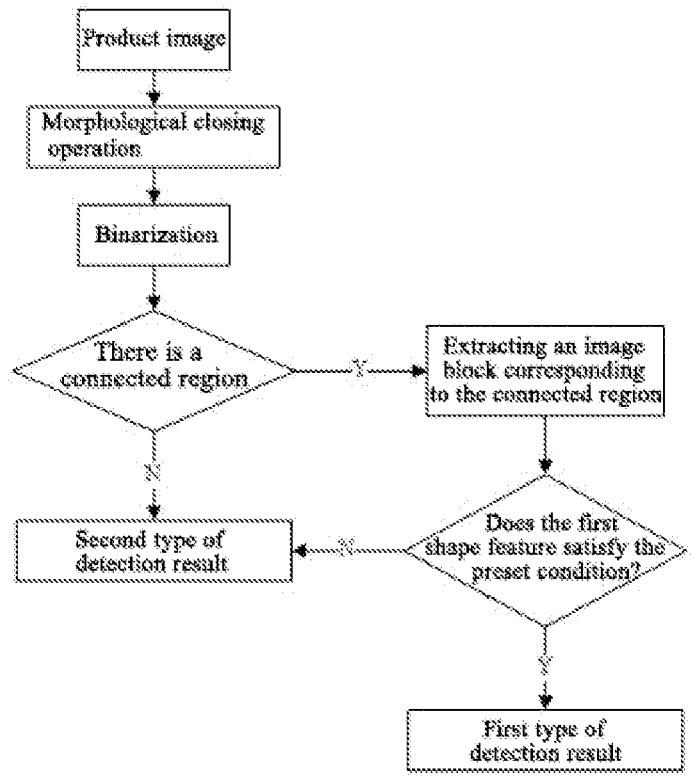
FIG. 5 is a flowchart of a method for detecting a second type of defect by a second localization and detection network according to an embodiment of the present disclosure.

In an example, as shown in FIG. 5, the detection process of the second type of defect in the product image by the second location and detection network is:

performing a morphological closing operation on the product image, performing binarization processing on the product image after processed, and performing region detection on the binary image obtained; judging whether there is a connected region based on the detection result, and if there is a connected region, extracting the image block corresponding to the connected region and calculating the first shape feature of the image block; and judging whether the first shape feature of the image block satisfies a preset condition, if Yes, generating the first type of detection result, and if Not, generate the second type of detection result.

In an embodiment, the first shape feature includes a black-and-white ratio, an area, an average area, an area range, and a distance between a center of figure and a center of mass, then when the black-and-white ratio is greater than a black-and-white ratio threshold value, the area is greater than an area threshold value, the average area is greater than an average area threshold value, the area range is greater than an area range threshold value, the distance between a center of figure and a center of mass is greater than a distance threshold value, it is determined that the first shape feature of the image block satisfies the preset condition. When any of the first shape features is not greater than the corresponding threshold, it is determined that the first shape feature of the image block does not satisfy the preset condition.

The black-and-white ratio threshold value, area threshold value, average area threshold value, area range threshold value, and distance threshold value can be set based on experience.

S2440: using a second judgment rule associated with a detection result output by the second localization and detection network to judge whether the product has the second type of defect.

The specific judgment process of the second judgment rule is:

if the detection result output by the second localization and detection network is the first type of detection result, determining that the product has the second type of defect, and marking the second type of defect using the locating box; and if the detection result output by the second localization and detection network is the second type of detection result, when a classification value of the second type of classification result is less than a preset score value, determining that the product has not the second type of defect, and when a classification value of the second type of classification result is not less than the preset score value, determining that the product has the second type of defect.

As shown in FIG. 3, take the wire mesh product as an example, when the classification network is used to classify and detect the product image of the wire mesh product, if the classification result output by the classification network indicates that the product image has a impurity defect, the impurity localization and detection network is used to locate and detect the impurity defect in the product image, and the impurity judgment rule is used to determine whether the product image has the impurity defect.

Figure 6:
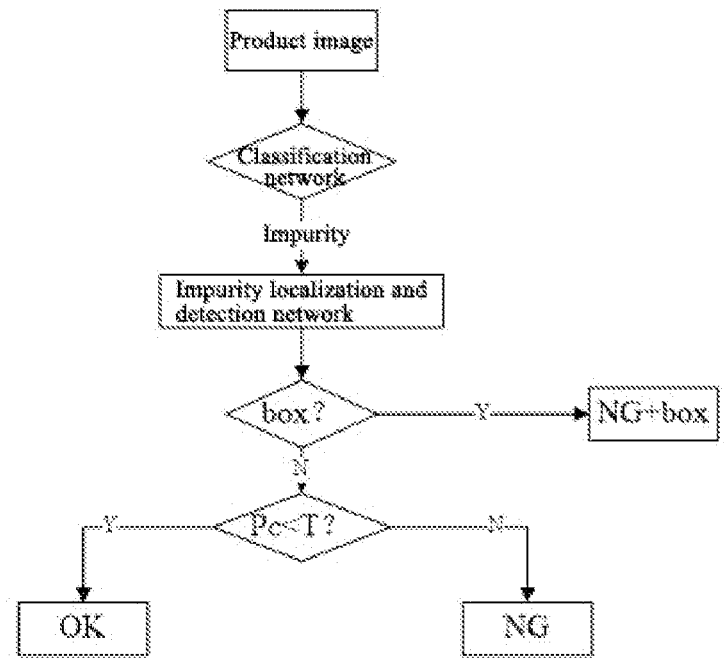
FIG. 6 is a flowchart of detecting impurity defects according to an embodiment of the present disclosure.

As shown in FIG. 6, the impurity judgment rule further detects whether there is the impurity defect in the product image based on the classification value corresponding to the impurity defect in the detection result output by the impurity location and detection network and the classification result output by the classification network, and when there is an impurity defect, locates the position of the impurity defect. The specific judgment process is:

When the detection result output by the impurity localization and detection network includes the box for locating the position of the impurity defect in the product image, it is judged that the product has an impurity defect and is an NG product, and the box is used to mark the impurity defect.

When the detection result output by the impurity localization and detection network does not include the box for locating the position of the impurity defect in the product image, it is judged whether the classification value Pc corresponding to the impurity defect in the classification result output by the classification network is less than a preset score value T;

if Pc is less than T, it is determined that the product does not have an impurity defect and is an OK product;

if Pc is not less than T, it is determined that the product has an impurity defect and is an NG product.

The preset score value T is a number close to the value 1, for example, the preset score value T=0.995.

Sixth Embodiment

The present embodiment further provides a product defect detection method. In the present embodiment, when the classification network outputs the third type of classification result, the above step S2300 further comprises S2450 to S2460:

S2450: extracting multiple image blocks where a product texture is located from the product image using a third localization and detection network associated with the third type of classification result; calculating whether there is a target image block having an area larger than a preset area among the multiple image blocks using the third localization and detection network, and if Not, generating a second type of detection result; if Yes, extracting a second shape feature of the target image block, and when the second shape feature satisfies a preset condition, generating a first type of detection result; when the second shape feature does not satisfy the preset condition, generating the second type of detection result;

wherein the first type of detection result is that a locating box for locating a position of the third type of defect has been detected, the second type of detection result is that a locating box for locating a position of the third type of defect has not been detected, and the locating box is a minimum circumscribed rectangle of the target image block.

In some embodiments, one or more of an area ratio, an eccentricity, and an orientation angle of the target image block are extracted as the second shape feature of the target image block. The area ratio is a ratio of a quantity of pixels in the target image block to a quantity of pixels in a target area of the product image where a minimum circumscribed rectangle of the target image block is located; the eccentricity is a ratio of a focal length to a length of a major axis in an ellipse which is equivalent to and has a same second order moment as the target image block; and the orientation angle is an angle of the major axis of the ellipse relative to a horizontal direction.

After determining the second shape feature of the image block, if each second shape feature of the target image block satisfies its corresponding preset condition, a first type of detection result is generated; if the target image block has one or more second shape features that do not satisfy its corresponding preset condition, a second type of detection result is generated. When the area ratio is smaller than an area ratio threshold value, it is determined to satisfy an area ratio preset condition; when the eccentricity is smaller than an eccentricity threshold value, it is determined to satisfy an eccentricity preset condition; and when the orientation angle is within an angle interval threshold value, it is determined to satisfy an angle preset condition. The area ratio threshold value, eccentricity threshold value, and angle interval threshold value can be set based on experience.

In some embodiments, the third type of defect is related to its distribution and position. Take the wire mesh product as an example, the fine mesh deviation defect is caused by a small number of mesh wires not overlapping due to the slight rotation of the mesh cloth when the mesh cloth is attached. Therefore, the fine mesh deviation defects are generally located in the boundary region of the product image.

Based on this situation, the present embodiment further detects the position of the target image block in the product image when each shape feature of the target image block satisfies its corresponding preset condition. If the target image block is located in the boundary region of the product image, a first type of detection result is generated, if the target image block is located in the non-boundary region of the product image, a second type of detection result is generated.

To sum up, the third location and detection network locates and detects the third type of defect in the product image based on texture features and shape features.

Figure 7:
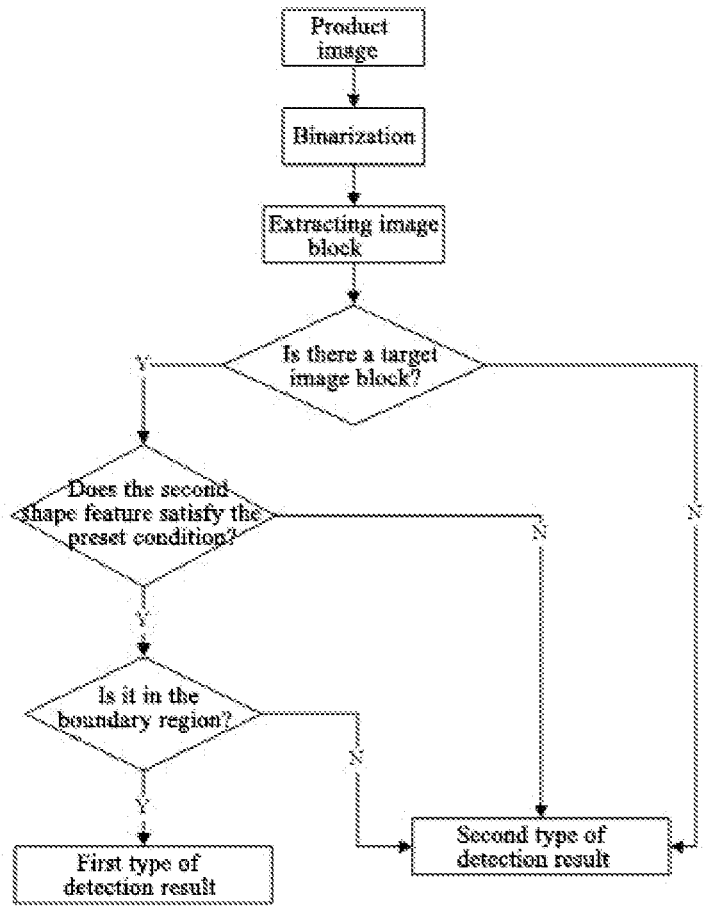
FIG. 7 is a flowchart of a method for detecting a third type of defect by a third localization and detection network according to an embodiment of the present disclosure.

In some embodiments, as shown in FIG. 7, the third localization and detection network may first perform binarization processing on the product image, perform region detection on the binary image obtained, and extract multiple images blocks where the product texture is located from the binary image based on the region detection result. Take the wire mesh product as an example, the mesh hole region detection is performed on the binarized wire mesh product image, the image block of the wire mesh product image where each mesh hole region is located can be extracted, and thus multiple image blocks can be obtained.

After extracting multiple image blocks, the third localization and detection network calculates the pixel area of each image block, compares the pixel area of each image block with a preset area, when there is an image block having a pixel area larger than the preset area, it indicates that the image block may have a third type of defect. The third localization and detection network uses the second shape feature of the target image block to judge whether there is a third type of defect in the target image block. When the second shape feature satisfies a preset condition, it indicates that the target image block very likely has the third type of defect. At this time, the minimum circumscribed rectangle of the target image block whose second shape feature satisfies the preset condition can be directly determined as the locating box for locating the third type of defect.

When the third type of defect is associated with its position in the product image, after the third localization and detection network screens out the target image blocks that satisfy the second shape feature, a secondary screening can be further performed on these target image blocks based on the positions of the target image blocks screened out in the product image, and the minimum circumscribed rectangle of the target image block located in the boundary region of the product image is determined as the locating box for locating the third type of defect.

The preset area can be set according to survey. For example, a certain number of negative sample images without product defects are surveyed to calculate an average area based on multiple image blocks extracted from the negative sample images, a certain number of positive sample images having the third type of defects are surveyed to calculate an average area based on multiple image blocks extracted from the positive sample images, and the preset area of the present embodiment is set based on these two average areas, so as to distinguish the image block where the third type of defect is located by using the preset area.

S2450: using a third judgment rule associated with a detection result output by the third localization and detection network to judge whether the product has the third type of defect.

The specific judgment process of the third judgment rule is:

if a detection result output by the third localization and detection network it is the first type of detection result, determining that the product has the third type of defect, and marking the third type of defect using the locating box; and if a detection result output by the third localization and detection network is the second type of detection result, determining that the product has not the third type of defect.

In the application scenarios where the product is a wire mesh product, the fine mesh deviation defect is the third type of defect, and the fine mesh deviation localization and detection network is the third localization and detection network. The localization and detection process of the fine mesh deviation defect using the fine mesh deviation localization and detection network is shown in FIG. 3 and FIG. 8.

As shown in FIG. 3, when the classification network is used to classify and detect the product image of the wire mesh product, if the classification network outputs the classification result that the product image does not have a defect, the fine mesh deviation localization and detection network is used to locate and detect the fine mesh deviation defect in the product image, and a fine mesh deviation judgment rule is used to determine whether the product image has a fine mesh deviation defect.

Figure 8:
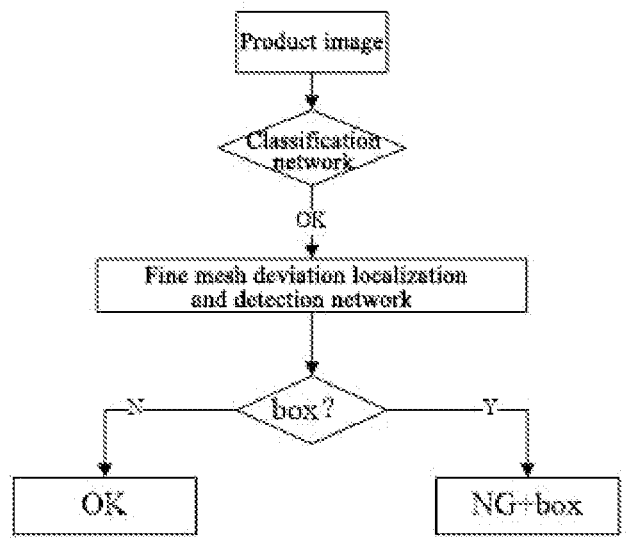
FIG. 8 is a flowchart of detecting the fine mesh deviation defect according to an embodiment of the present disclosure.

As shown in FIG. 8, when the detection result output by the fine mesh deviation localization and detection network includes the box for locating the position of the fine mesh deviation defect in the product image, it is judged that the product has a fine mesh deviation defect and is an NG product, and the box is used to mark the fine mesh deviation defect. When the detection result output by the fine mesh deviation localization and detection network does not include the box for locating the position of the fine mesh deviation defect in the product image, it is judged that the product does not have a fine mesh deviation defect and is an OK product.

Seventh Embodiment

Figure 9:
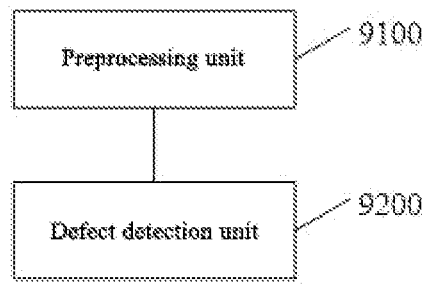
FIG. 9 is a block diagram of the structure of a product defect detection device according to an embodiment of the present disclosure.

FIG. 9 is a block diagram of the structure of a product defect detection device according to the present embodiment of the present disclosure. As shown in FIG. 9, the device in the present embodiment comprises:

a preprocessing unit 9100 for constructing a defect detection framework including a classification network, a localization and detection network, and a judgment network; setting a quantity of the localization and detection network and judgment rules of the judgment network according to classification results of the classification network, wherein each localization and detection network is associated with a classification result, and each judgment rule is associated with a detection result of the localization and detection network; and training the classification network by using a sample image of a product containing different defect types to obtain a classification network capable of classifying defect types existing in the sample image; and a defect detection unit 9200 for, when performing product defect detection, inputting an product image acquired into the defect detection framework, using the classification network to classify the defect types in the product image, detecting defects of the product image according to a localization and detection network associated with a classification result, then judging whether the product has a defect according to a judgment rule associated with the detection result obtained, and detecting a defect type and a defect position when the product has a defect.

In some embodiments, the classification result includes: a first type of classification result, a second type of classification result, and a third type of classification result. The first type of classification result is that it has been detected that there is a first type of defect in the product image, and the first type of defect is a defect for which a classification accuracy rate of defect type by the classification network is greater than a first threshold value. The second type of classification result is that it has been detected that there is a second type of defect in the product image, and the second type of defect is a defect for which a classification accuracy rate of defect type by the classification network is not greater than the first threshold value. The third type of classification result is that it is detected that there is not a defect in the product image. The classification result further includes a fourth type of classification result that it has been detected that there is a fourth type of defect in the product image, the fourth type of defect is a defect type that the classification network can correctly classify, and the fourth type of classification result is not associated with a localization and detection network.

In some embodiments, the defect detection unit 9200 comprises a first detection module and a first judgment module;

the first detection module is for, when the classification network outputs the first type of classification result, extracting multiple image blocks where a product texture is located from the product image using a first localization and detection network associated with the first type of classification result; and calculating whether there is a target image block having an area larger than a preset area among the multiple image blocks using the first localization and detection network, and if Yes, generating a first type of detection result; if Not, generating a second type of detection result; wherein the first type of detection result is that a locating box for locating a position of the first type of defect has been detected, the second type of detection result is that a locating box for locating a position of the first type of defect has not been detected, and the locating box is a minimum circumscribed rectangle of the target image block;

the first judgment module is for using a first judgment rule associated with a detection result output by the first localization and detection network to judge whether the product has the first type of defect; if it is the first type of detection result, determining that the product has the first type of defect, and marking the first type of defect using the locating box; and if it is the second type of detection result, determining that the product has the first type of defect, but not marking the first type of defect.

In some embodiments, the defect detection unit 9200 further comprises a second detection module and a second judgment module;

the second detection module is for, when the classification network outputs the second type of classification result, performing morphological detection on the product image using a second localization and detection network associated with the second type of classification result; when a locating box for locating the second type of defect is not detected, generating a second type of detection result; when a locating box for locating the second type of defect is detected, judging whether a first shape feature of an image block of the product image where the locating box is located satisfies a preset condition, if Yes, generating a first type of detection result, if Not, generating the second type of detection result; wherein the first type of detection result is that a locating box for locating a position of the second type of defect has been detected, the second type of detection result is that a locating box for locating a position of the second type of defect has not been detected, and the locating box is a minimum circumscribed rectangle of an image block whose first shape feature satisfies the preset condition;

the second judgment module is for using a second judgment rule associated with a detection result output by the second localization and detection network to judge whether the product has the second type of defect; if it is the first type of detection result, determining that the product has the second type of defect, and marking the second type of defect using the locating box; and if it is the second type of detection result, when a classification value of the second type of classification result is less than a preset score value, determining that the product has not the second type of defect, and when a classification value of the second type of classification result is not less than the preset score value, determining that the product has the second type of defect.

In some embodiments, the second detection module is for performing a morphological closing operation on the product image, performing binarization processing on the image after processed by the morphological closing operation, and performing region detection on a binary image obtained; when it has been detected that the binary image has a connected region, determining that the locating box has been detected, wherein an image block of the product image corresponding to the connected region is extracted, and a minimum circumscribed rectangle of the image block is used as the locating box; when it has not been detected that the binary image has a connected region, determining that the locating box is has not been detected.

The second detection module is further for extracting one or more of a black-and-white ratio, an area, an average area, an area range, and a distance between a center of figure and a center of mass of the image block corresponding to the locating box as the first shape feature of the image block; if each first shape feature of the image block satisfies its corresponding preset condition, generating the first type of detection result; if the image block has one or more first shape features that do not satisfy its corresponding preset condition, generating the second type of detection result; wherein when the black-and-white ratio is greater than a black-and-white ratio threshold value, it is determined to satisfy a black-and-white ratio preset condition; when the area is greater than an area threshold value, it is determined to satisfy an area preset condition; when the average area is greater than an average area threshold value, it is determined to satisfy an average area preset condition; when the area range is greater than an area range threshold value, it is determined to satisfy a range preset condition; and when the distance between a center of figure and a center of mass is greater than a distance threshold value, it is determined to satisfy a distance preset condition; the black-and-white ratio is a ratio of a quantity of black pixels to a quantity of white pixels in a binarized image block corresponding to the image block; the average area is an average value of pixel areas of all connected regions extracted from the image block; and the area range is a difference between a pixel area of a largest connected region and a pixel area of a smallest connected region extracted from the image block.

In some embodiments, the defect detection unit 9200 further comprises a third detection module and a third judgment module;

the third detection module is for, when the classification network outputs the third type of classification result, extracting multiple image blocks where a product texture is located from the product image using a third localization and detection network associated with the third type of classification result; and calculating whether there is a target image block having an area larger than a preset area among the multiple image blocks using the third localization and detection network, and if Not, generating a second type of detection result; if Yes, extracting a second shape feature of the target image block, and when the second shape feature satisfies a preset condition, generating a first type of detection result; when the second shape feature does not satisfy the preset condition, generating the second type of detection result; wherein the first type of detection result is that a locating box for locating a position of the third type of defect has been detected, the second type of detection result is that a locating box for locating a position of the third type of defect has not been detected, and the locating box is a minimum circumscribed rectangle of the target image block;

the third judgment module is for using a third judgment rule associated with a detection result output by the third localization and detection network to judge whether the product has the third type of defect; if it is the first type of detection result, determining that the product has the third type of defect, and marking the third type of defect using the locating box; and if it is the second type of detection result, determining that the product has not the third type of defect.

In some embodiments, the third detection module is specifically for extracting one or more of an area ratio, an eccentricity, and an orientation angle of the target image block as the second shape feature of the target image block; if each second shape feature of the target image block satisfies its corresponding preset condition, generating a first type of detection result; if the target image block has one or more second shape features that do not satisfy its corresponding preset condition, generating a second type of detection result; wherein when the area ratio is smaller than an area ratio threshold value, it is determined to satisfy an area ratio preset condition; when the eccentricity is smaller than an eccentricity threshold value, it is determined to satisfy an eccentricity preset condition; and when the orientation angle is within an angle interval threshold value, it is determined to satisfy an angle preset condition; the area ratio is a ratio of a quantity of pixels in the target image block to a quantity of pixels in a target area of the product image where a minimum circumscribed rectangle of the target image block is located; the eccentricity is a ratio of a focal length to a length of a major axis in an ellipse which is equivalent to and has a same second order moment as the target image block; and the orientation angle is an angle of the major axis of the ellipse relative to a horizontal direction.

In some embodiments, the third detection module is further for, when each shape feature of the target image block satisfies its corresponding preset condition, detecting where the target image block is located in the product image, and if the target image block is located in a boundary region of the product image, generating a first type of detection result; if the target image block is located in a non-boundary region of the product image, generating a second type of detection result.

For the specific implementing mode of each module in the device embodiment, please refer to the related content of the method embodiment, which will not be repeated here.

Eighth Embodiment

Figure 10:
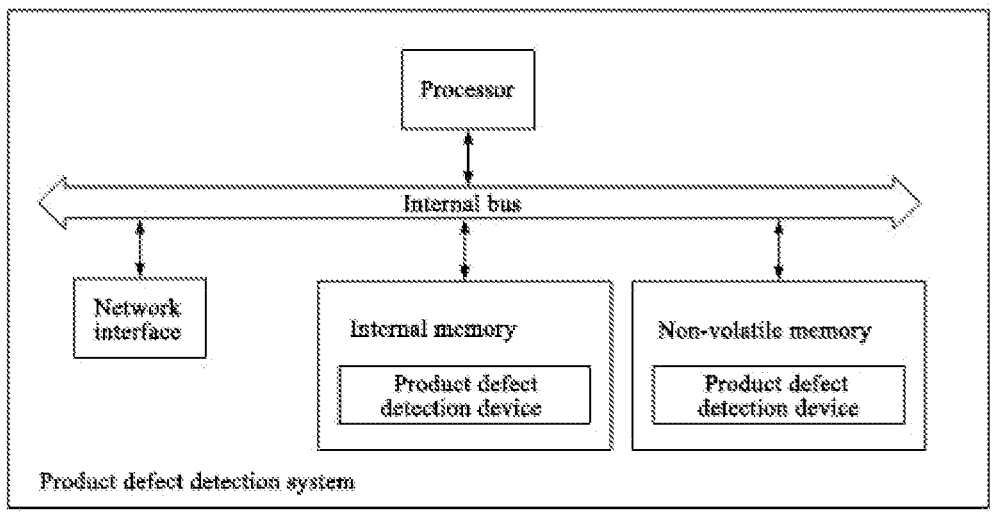
FIG. 10 is a block diagram of the structure of a product defect detection system according to an embodiment of the present disclosure.

FIG. 10 is a block diagram of the structure of a product defect detection system according to an embodiment of the present disclosure. As shown in FIG. 10, at the hardware level, the system includes a processor, and optionally an internal bus, a network interface, and a memory. Among them, the memory may include an internal memory, such as high-speed random access memory (RAM), and may also include non-volatile memory, such as at least one disk memory.

The processor, network interface and memory can be connected to each other via an internal bus. The internal bus can be an ISA (Industry Standard Architecture) bus, a PCI (Peripheral Component Interconnect) bus or an EISA (Extended Industry Standard Architecture) bus, etc. The bus can be divided into address bus, data bus, control bus, etc. For ease of presentation, only one bidirectional arrow is shown in FIG. 10, but it does not mean that there is only one bus or one type of bus.

The memory is used to store programs. Specifically, the program may include program codes, and the program codes include computer executable instructions. The memory may include internal memory and non-volatile memory, and provide instructions and data to the processor.

The processor reads the corresponding computer program from the non-volatile memory into the internal memory and then runs it to form a product defect detection device on a logical level. The processor executes the program stored in the memory to implement the product defect detection method as described above.

The method performed by the product defect detection device disclosed in the embodiment shown in FIG. 10 of this specification can be applied to a processor or implemented by the processor. The processor may be an integrated circuit chip having signal processing capabilities. In the implementation process, the steps of the product defect detection method described above can be completed by integrated logic circuits (in the form of hardware) or instructions (in the form of software) in the processor. The processor may be a general-purpose processor including a central processing unit (CPU), a network processor (NP), etc.; it may also be a digital signal processor (DSP), an application specific dedicated integrated circuit (ASIC), a field-programmable gate array (FPGA) or other programmable logic devices, discrete gates or transistor logic devices, discrete hardware components, which can implement or execute the methods, steps, and logical block diagrams disclosed in the embodiments of this specification. The general-purpose processor may be a microprocessor or any conventional processor or the like. The steps of the method disclosed in the embodiments of this specification can be directly embodied as hardware and executed by a decoding processor, or executed by a combination of hardware in the decoding processor and software modules. The software module can be located in a storage medium well known in the art such as random access memory, flash memory, read-only memory, programmable read-only memory, or electrically erasable programmable memory, registers, etc. The storage medium is located in the memory, and the processor reads the information in the memory and cooperates with its hardware to complete the steps of the above product defect detection method in combination with.

The present disclosure further provides a computer readable storage medium.

The computer readable storage medium stores one or more computer programs. The one or more computer programs include instructions. When the instructions are executed by the processor, the product defect detection method as described above can be implemented.

In order to clearly describe the technical solutions of the embodiments of the present disclosure, in the embodiments of the present disclosure, words such as "first" and "second" are used to distinguish the same or similar items having basically the same function and effect. A person skilled in the art can understand that the words "first" and "second" are not intended to limit the quantity and execution order.

The above merely describe particular embodiments of the present disclosure. By the teaching of the present disclosure, a person skilled in the art can make other modifications or variations based on the above embodiments. A person skilled in the art should appreciate that, the detailed description above is only for the purpose of better explaining the present disclosure, and the protection scope of the present disclosure should be subject to the protection scope of the claims.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A product defect detection method, comprising:
constructing a defect detection framework including a classification network, a localization and detection network, and a judgment network, and setting a quantity of the localization and detection network and judgment rules of the judgment network according to classification results of the classification network, wherein each localization and detection network is associated with a classification result, and each judgment rule is associated with a detection result of the localization and detection network;

training the classification network by using a sample image of a product containing different defect types to obtain a classification network capable of classifying defect types existing in the sample image; and when performing product defect detection, inputting a product image acquired into the defect detection framework, using the classification network to classify defect types in the product image, detecting defects of the product image according to a localization and detection network associated with a classification result, then judging whether the product has a defect according to a judgment rule associated with a detection result obtained, and detecting a defect type and a defect position when the product has a defect wherein the classification result includes:

a first type of classification result that it has been detected that there is a first type of defect in the product image, wherein the first type of defect is a defect for which a classification accuracy rate of defect type by the classification network is greater than a first threshold value;

a second type of classification result that it has been detected that there is a second type of defect in the product image, wherein the second type of defect is a defect for which a classification accuracy rate of defect type by the classification network is not greater than the first threshold value; and a third type of classification result that it has been detected that there is not a defect in the product image.

2. The method according to claim 1, wherein the classification result further includes a fourth type of classification result that it has been detected that there is a fourth type of defect in the product image, wherein the fourth type of defect is a defect type that the classification network can correctly classify, and the fourth type of classification result is not associated with a localization and detection network.

3. The method according to claim 1, wherein detecting defects of the product image according to a localization and detection network associated with a classification result comprises:

when the classification network outputs the first type of classification result, extracting multiple image blocks where a product texture is located from the product image using a first localization and detection network associated with the first type of classification result; and calculating whether there is a target image block having an area larger than a preset area among the multiple image blocks using the first localization and detection network, and if Yes, generating a first type of detection result; if Not, generating a second type of detection result;

wherein the first type of detection result is that a locating box for locating a position of the first type of defect has been detected, the second type of detection result is that a locating box for locating a position of the first type of defect has not been detected, and the locating box is a minimum circumscribed rectangle of the target image block.

4. The method according to claim 3, wherein judging whether the product has a defect according to a judgment rule associated with a detection result obtained, and detecting a defect type and a defect position when the product has a defect comprises:

using a first judgment rule associated with a detection result output by the first localization and detection network to judge whether the product has the first type of defect;

if it is the first type of detection result, determining that the product has the first type of defect, and marking the first type of defect using the locating box; and if it is the second type of detection result, determining that the product has the first type of defect, but not marking the first type of defect.

5. The method according to claim 3, wherein a certain number of negative sample images without product defects are surveyed to calculate an average area based on multiple image blocks extracted from the negative sample images, a certain number of positive sample images having the first type of defect are surveyed to calculate an average area based on multiple image blocks extracted from the positive sample images, and the preset area is set based on these two average areas.

6. The method according to claim 1, wherein detecting defects of the product image according to a localization and detection network associated with a classification result comprises:

when the classification network outputs the second type of classification result, performing morphological detection on the product image using a second localization and detection network associated with the second type of classification result;

when a locating box for locating the second type of defect is not detected, generating a second type of detection result;

when a locating box for locating the second type of defect is detected, judging whether a first shape feature of an image block of the product image where the locating box is located satisfies a preset condition, if yes, generating a first type of detection result, if not, generating the second type of detection result;

wherein the first type of detection result is that a locating box for locating a position of the second type of defect has been detected, the second type of detection result is that a locating box for locating a position of the second type of defect has not been detected, and the locating box is a minimum circumscribed rectangle of an image block whose first shape feature satisfies the preset condition.

7. The method according to claim 6, wherein judging whether the product has a defect according to a judgment rule associated with a detection result obtained, and detecting a defect type and a defect position when the product has a defect comprises:

using a second judgment rule associated with a detection result output by the second localization and detection network to judge whether the product has the second type of defect;

if it is the first type of detection result, determining that the product has the second type of defect, and marking the second type of defect using the locating box; and if it is the second type of detection result, when a classification value of the second type of classification result is less than a preset score value, determining that the product has not the second type of defect, and when a classification value of the second type of classification result is not less than the preset score value, determining that the product has the second type of defect.

8. The method according to claim 6, wherein performing morphological detection on the product image using a second localization and detection network associated with the second type of classification result comprises:
   performing a morphological closing operation on the product image, performing binarization processing on the image after processed by the morphological closing operation, and performing region detection on a binary image obtained;
   when it has been detected that the binary image has a connected region, determining that the locating box has been detected, wherein an image block of the product image corresponding to the connected region is extracted, and a minimum circumscribed rectangle of the image block is used as the locating box;
   when it has not been detected that the binary image has a connected region, determining that the locating box has not been detected.

9. The method according to claim 6, wherein judging whether a first shape feature of an image block of the product image where the locating box is located satisfies a preset condition, if yes, generating a first type of detection result, if not, generating the second type of detection result comprises:
   extracting one or more of a black-and-white ratio, an area, an average area, an area range, and a distance between a center of figure and a center of mass of the image block corresponding to the locating box as the first shape feature of the image block;
   if each first shape feature of the image block satisfies its corresponding preset condition, generating the first type of detection result; if the image block has one or more first shape features that do not satisfy its corresponding preset condition, generating the second type of detection result;
   wherein when the black-and-white ratio is greater than a black-and-white ratio threshold value, it is determined to satisfy a black-and-white ratio preset condition; when the area is greater than an area threshold value, it is determined to satisfy an area preset condition; when the average area is greater than an average area threshold value, it is determined to satisfy an average area preset condition; when the area range is greater than an area range threshold value, it is determined to satisfy a range preset condition; and when the distance between a center of figure and a center of mass is greater than a distance threshold value, it is determined to satisfy a distance preset condition;
   the black-and-white ratio is a ratio of a quantity of black pixels to a quantity of white pixels in a binarized image block corresponding to the image block; the average area is an average value of pixel areas of all connected regions extracted from the image block; and the area range is a difference between a pixel area of a largest connected region and a pixel area of a smallest connected region extracted from the image block.

10. The method according to claim 1, wherein detecting defects of the product image according to a localization and detection network associated with a classification result comprises:
   when the classification network outputs the third type of classification result, extracting multiple image blocks where a product texture is located from the product image using a third localization and detection network associated with the third type of classification result; and
   calculating whether there is a target image block having an area larger than a preset area among the multiple image blocks using the third localization and detection network, and if Not, generating a second type of detection result; if Yes, extracting a second shape feature of the target image block, and when the second shape feature satisfies a preset condition, generating a first type of detection result; when the second shape feature does not satisfy the preset condition, generating the second type of detection result;
   wherein the first type of detection result is that a locating box for locating a position of the third type of defect has been detected, the second type of detection result is that a locating box for locating a position of the third type of defect has not been detected, and the locating box is a minimum circumscribed rectangle of the target image block.

11. The method according to claim 10, wherein judging whether the product has a defect according to a judgment rule associated with a detection result obtained, and detecting a defect type and a defect position when the product has a defect comprises:
   using a third judgment rule associated with a detection result output by the third localization and detection network to judge whether the product has the third type of defect;
   if it is the first type of detection result, determining that the product has the third type of defect, and marking the third type of defect using the locating box; and
   if it is the second type of detection result, determining that the product has not the third type of defect.

12. The method according to claim 10, wherein extracting a second shape feature of the target image block, and when the second shape feature satisfies a preset condition, generating a first type of detection result; when the second shape feature does not satisfy the preset condition, generating the second type of detection result comprises:
   extracting one or more of an area ratio, an eccentricity, and an orientation angle of the target image block as the second shape feature of the target image block;
   if each second shape feature of the target image block satisfies its corresponding preset condition, generating a first type of detection result; if the target image block has one or more second shape features that do not satisfy its corresponding preset condition, generating a second type of detection result;
   wherein when the area ratio is smaller than an area ratio threshold value, it is determined to satisfy an area ratio preset condition; when the eccentricity is smaller than an eccentricity threshold value, it is determined to satisfy an eccentricity preset condition; and when the orientation angle is within an angle interval threshold value, it is determined to satisfy an angle preset condition;
   the area ratio is a ratio of a quantity of pixels in the target image block to a quantity of pixels in a target area of the product image where a minimum circumscribed rectangle of the target image block is located; the eccentricity is a ratio of a focal length to a length of a major axis in an ellipse which is equivalent to and has a same second order moment as the target image block; and the orientation angle is an angle of the major axis of the ellipse relative to a horizontal direction.

13. The method according to claim 12, wherein when each shape feature of the target image block satisfies its corresponding preset condition, the method further comprises:
   detecting where the target image block is located in the product image, and if the target image block is located in a boundary region of the product image, generating a first type of detection result; if the target image block is located in a non-boundary region of the product image, generating a second type of detection result.

14. The method according to claim 1, wherein the first threshold value is set to 0.90.

15. A product defect detection device, comprising:
   a preprocessing unit for constructing a defect detection framework including a classification network, a localization and detection network, and a judgment network; setting a quantity of the localization and detection network and judgment rules of the judgment network according to classification results of the classification network, wherein each localization and detection network is associated with a classification result, and each judgment rule is associated with a detection result of the localization and detection network; and training the classification network by using a sample image of a product containing different defect types to obtain a classification network capable of classifying defect types existing in the sample image; and
   a defect detection unit for, when performing product defect detection, inputting an product image acquired into the defect detection framework, using the classification network to classify the defect types in the product image, detecting defects of the product image according to a localization and detection network associated with a classification result, then judging whether the product has a defect according to a judgment rule associated with a detection result obtained, and detecting a defect type and a defect position when the product has a defect, wherein:
   the defect detection unit comprises a first detection module and a first judgment module;
   the first detection module is for, when the classification network outputs the first type of classification result, extracting multiple image blocks where a product texture is located from the product image using a first localization and detection network associated with the first type of classification result; and calculating whether there is a target image block having an area larger than a preset area among the multiple image blocks using the first localization and detection network, and if Yes, generating a first type of detection result if Not, generating a second type of detection result wherein the first type of detection result is that a locating box for locating a position of the first type of defect has been detected, the second type of detection result is that a locating box for locating a position of the first type of defect has not been detected, and the locating box is a minimum circumscribed rectangle of the target image block;
   the first judgment module is for using a first judgment rule associated with a detection result output by the first localization and detection network to judge whether the product has the first type of defect if it is the first type of detection result, determining that the product has the first type of defect, and marking the first type of defect using the locating box; and if it is the second type of detection result, determining that the product has the first type of defect, but not marking the first type of defect;
   the defect detection unit further comprises a second detection module and a second judgment module;
   the second detection module is for, when the classification network outputs the second type of classification result, performing morphological detection on the product image using a second localization and detection network associated with the second type of classification result; when a locating box for locating the second type of defect is not detected, generating a second type of detection result;
   when a locating box for locating the second type of defect is detected, judging whether a first shape feature of an image block of the product image where the locating box is located satisfies a preset condition, if Yes, generating a first type of detection result, if Not, generating the second type of detection result wherein the first type of detection result is that a locating box for locating a position of the second type of defect has been detected, the second type of detection result is that a locating box for locating a position of the second type of defect has not been detected, and the locating box is a minimum circumscribed rectangle of an image block whose first shape feature satisfies the preset condition;
   the second judgment module is for using a second judgment rule associated with a detection result output by the second localization and detection network to judge whether the product has the second type of defect if it is the first type of detection result, determining that the product has the second type of defect, and marking the second type of defect using the locating box; and if it is the second type of detection result, when a classification value of the second type of classification result is less than a preset score value, determining that the product has not the second type of defect, and when a classification value of the second type of classification result is not less than the preset score value, determining that the product has the second type of defect;
   the defect detection unit further comprises a third detection module and a third judgment module;
   the third detection module is for, when the classification network outputs the third type of classification result, extracting multiple image blocks where a product texture is located from the product image using a third localization and detection network associated with the third type of classification result and calculating whether there is a target image block having an area larger than a preset area among the multiple image blocks using the third localization and detection network, and if Not, generating a second type of detection result; if Yes, extracting a second shape feature of the target image block, and when the second shape feature satisfies a preset condition, generating a first type of detection result when the second shape feature does not satisfy the preset condition, generating the second type of detection result wherein the first type of detection result is that a locating box for locating a position of the third type of defect has been detected, the second type of detection result is that a locating box for locating a position of the third type of defect has not been detected, and the locating box is a minimum circumscribed rectangle of the target image block; and
   the third judgment module is for using a third judgment rule associated with a detection result output by the third localization and detection network to judge whether the product has the third type of defect if it is the first type of detection result, determining that the product has the third type of defect, and marking the third type of defect using the locating box; and if it is the second type of detection result, determining that the product has not the third type of defect.

16. A product defect detection system, comprising: a memory and a processor;

the memory stores computer executable instructions;

when the computer executable instructions are executed, the processor executes a product defect detection method, wherein the method comprises:

constructing a defect detection framework including a classification network, a localization and detection network, and a judgment network, and setting a quantity of the localization and detection network and judgment rules of the judgment network according to classification results of the classification network, wherein each localization and detection network is associated with a classification result, and each judgment rule is associated with a detection result of the localization and detection network;

training the classification network by using a sample image of a product containing different defect types to obtain a classification network capable of classifying defect types existing in the sample image; and when performing product defect detection, inputting a product image acquired into the defect detection framework, using the classification network to classify defect types in the product image, detecting defects of the product image according to a localization and detection network associated with a classification result, then judging whether the product has a defect according to a judgment rule associated with a detection result obtained, and detecting a defect type and a defect position when the product has a defect, wherein the classification result includes:

a first type of classification result that it has been detected that there is a first type of defect in the product image, wherein the first type of defect is a defect for which a classification accuracy rate of defect type by the classification network is greater than a first threshold value;

a second type of classification result that it has been detected that there is a second type of defect in the product image, wherein the second type of defect is a defect for which a classification accuracy rate of defect type by the classification network is not greater than the first threshold value; and a third type of classification result that it has been detected that there is not a defect in the product image.

17. The product defect detection system according to claim 16, wherein the classification result further includes a fourth type of classification result that it has been detected that there is a fourth type of defect in the product image, wherein the fourth type of defect is a defect type that the classification network can correctly classify, and the fourth type of classification result is not associated with a localization and detection network.

\* \* \* \* \*